(12) United States Patent
Huang

(10) Patent No.: US 11,077,788 B2
(45) Date of Patent: Aug. 3, 2021

(54) METHOD FOR CONTROLLING AND SWITCHING OPERATIONAL MODES OF AN ADDITIONAL LAMP FOR A VEHICLE

(71) Applicant: Mei-Hui Huang, Tainan (TW)

(72) Inventor: Mei-Hui Huang, Tainan (TW)

( * ) Notice: Subject to any disclaimer, the term of this patent is extended or adjusted under 35 U.S.C. 154(b) by 11 days.

(21) Appl. No.: 16/808,583

(22) Filed: Mar. 4, 2020

(65) Prior Publication Data

US 2020/0290504 A1 Sep. 17, 2020

(30) Foreign Application Priority Data

Mar. 11, 2019 (TW) ................................ 108108032

(51) Int. Cl.
*B60Q 1/24* (2006.01)
*B60Q 1/26* (2006.01)
*B60Q 1/00* (2006.01)

(52) U.S. Cl.
CPC .............. *B60Q 1/24* (2013.01); *B60Q 1/0011* (2013.01); *B60Q 1/2603* (2013.01); *B60Q 1/2615* (2013.01)

(58) Field of Classification Search
CPC ...... B60Q 1/0011; B60Q 1/24; B60Q 1/2603; B60Q 1/2615
See application file for complete search history.

(56) References Cited

U.S. PATENT DOCUMENTS

| | | | | |
|---|---|---|---|---|
| 5,028,908 A * | 7/1991 | Juang | ....................... | B60Q 1/38 340/479 |
| 5,894,272 A * | 4/1999 | Brassier | ............... | B60Q 1/0023 340/435 |
| 8,588,997 B2 * | 11/2013 | Pribula | .................... | B60Q 1/38 701/9 |
| 2006/0273891 A1 * | 12/2006 | Quach | .................... | B60Q 1/302 340/467 |
| 2013/0258688 A1 * | 10/2013 | Kalapodas | ............. | B60Q 1/085 362/465 |
| 2015/0360603 A1 * | 12/2015 | Miner | .................... | B60Q 1/302 340/479 |
| 2017/0043712 A1 * | 2/2017 | Paszkowicz | ............. | B60Q 3/76 |
| 2017/0313250 A1 * | 11/2017 | Fischer | .................. | H04N 5/235 |
| 2019/0248278 A1 * | 8/2019 | Salter | ....................... | B60Q 1/44 |
| 2020/0189453 A1 * | 6/2020 | Tucker | .................... | B60Q 1/46 |

* cited by examiner

*Primary Examiner* — Tsion Tumebo
(74) *Attorney, Agent, or Firm* — Karin L. Williams; Alan D. Kamrath; Mayer & Williams PC

(57) ABSTRACT

A method for controlling and switching operational modes of an additional lamp for a vehicle includes confirming a pre-set operating mode of the additional lamp. The additional lamp is switched from the pre-set operating mode to another operating mode only when a continuous first signal and intermittent plural second signals come from the vehicle. When the brake is operating and the additional lamp is in a non-flickering mode, the additional lamp generates non-flickering light. When the brake is operating and the additional lamp is in the flickering mode, the additional lamp generates flickering light. The additional lamp is turned off when the braking operation stops. When the braking operation continues and the additional lamp is in the flickering mode, the additional lamp keeps outputting flickering light. When the braking operation continues and the additional lamp is in the non-flickering mode, the additional lamp keeps outputting non-flickering light.

10 Claims, 2 Drawing Sheets

METHOD FOR CONTROLLING AND SWITCHING OPERATIONAL MODES OF AN ADDITIONAL LAMP FOR A VEHICLE

BACKGROUND OF THE INVENTION

The present invention relates to a method for controlling an additional lamp for a vehicle and, more particularly, to a method for controlling and switching operational modes of an additional lamp for a vehicle.

Lamps on a vehicle are used for illumination and indicating a moving status of the vehicle. For example, directional lamps are used to indicate the vehicle is about to change the lane or to turn, and brake lamps are used to indicate the speed of the vehicle is dropping. A type of aftermarket vehicle lamp, not an original equipment manufacturer (OEM) lamp, is mounted to a rear side of a vehicle to operate together with the brake lamps. The aftermarket vehicle lamp can operate in different modes (including a flickering mode and a non-flickering mode) during braking, thereby enhancing the alarming effect during braking. However, the aftermarket vehicle lamps are not OEM lamps and, thus, cannot be switched between different modes by operating a device (such as a button) originally mounted in the vehicle, failing to provide convenient use.

BRIEF SUMMARY OF THE INVENTION

In a first aspect, the present invention provides a method for controlling and switching operational modes of an additional lamp for a vehicle. The method includes:

confirming a pre-set operating mode of the additional lamp, with the pre-set operating mode being a non-flickering mode or a flickering mode;

determining whether to switch the pre-set operating mode of the additional lamp to another operating mode, wherein the additional lamp is switched from the pre-set operating mode to the another operating mode when a continuous first signal and intermittent plural second signals come from the vehicle, and wherein the additional lamp remains in the pre-set operating anode when no continuous first signal and no intermittent plural second signals come from the vehicle;

carrying out a braking operation, wherein when the brake is operating and the additional lamp is in the non-flickering mode, the additional lamp generates non-flickering light, and wherein when the brake is operating and the additional lamp is in the flickering mode, the additional lamp generates flickering light; and identifying whether the braking operation continues, wherein the additional lamp is turned off when the braking operation stops, wherein when the braking operation continues and the additional lamp is in the flickering mode, the additional lamp keeps outputting flickering light, and wherein when the braking operation continues and the additional lamp is in the non-flickering mode, the additional lamp keeps outputting non-flickering light.

In a second aspect, the present invention provides a method for controlling and switching operational anodes of an additional lamp for a vehicle. The method includes:

identifying whether a position lamp of the vehicle is in an on state, wherein the additional lamp outputs light when the position lamp is on, and wherein the additional lamp does not output light when the position lamp is off;

confirming a pre-set operating mode of the additional lamp, with the pre-set operating mode being a non-flickering mode or a flickering mode;

determining whether to switch the pre-set operating mode of the additional lamp to another operating mode, wherein the additional lamp is switched from the pre-set operating anode to the another operating mode when a continuous first signal and intermittent plural second signals come from the vehicle, and wherein the additional lamp remains in the pre-set operating mode when no continuous first signal and no intermittent plural second signals come from the vehicle;

identifying whether a braking operation is running, wherein when the braking operation is running, the position lamp is off, and the additional lamp is in the non-flickering mode, the additional lamp generates non-flickering light, wherein when the braking operation is running, the position lamp is on, and the additional lamp is in the flickering mode, the additional lamp generates flickering light, wherein when the braking operation is not running and the position lamp is off, the additional lamp remains in an off state regardless of the operating mode of the additional lamp, and wherein when the braking operation is not running and the position lamp is on, the additional lamp is turned on and does not flicker regardless of the operating mode of the additional lamp; and identifying whether the braking operation continues, wherein when the braking operation continues, the position lamp is off, and the additional lamp is in the non-flickering mode, the additional lamp keeps outputting non-flickering light, wherein when the braking operation continues, the position lamp is off, and the additional lamp is in the flickering mode, the additional lamp keeps outputting flickering light, wherein when the braking operation is not running and the position lamp is off, the additional lamp is turned off regardless of the operating mode of the additional lamp, and wherein when the braking operation is not running and the position lamp is on, the additional lamp remains in an on state without flickering regardless of the operating mode of the additional lamp.

In an example, the intermittent plural second signals includes receiving two second signals within 3 seconds.

In an example, the first signal is a braking signal, and the second signal is a signal for turning on a position lamp or a headlamp of the vehicle. The intermittent plural second signals includes receiving three second signals within 3 seconds.

The present invention will become clearer in light of the following detailed description of illustrative embodiments of this invention described in connection with the drawings.

DESCRIPTION OF IHE DRAWINGS

DETAILED DESCRIPTION OF THE INVENTION

Figure 1:
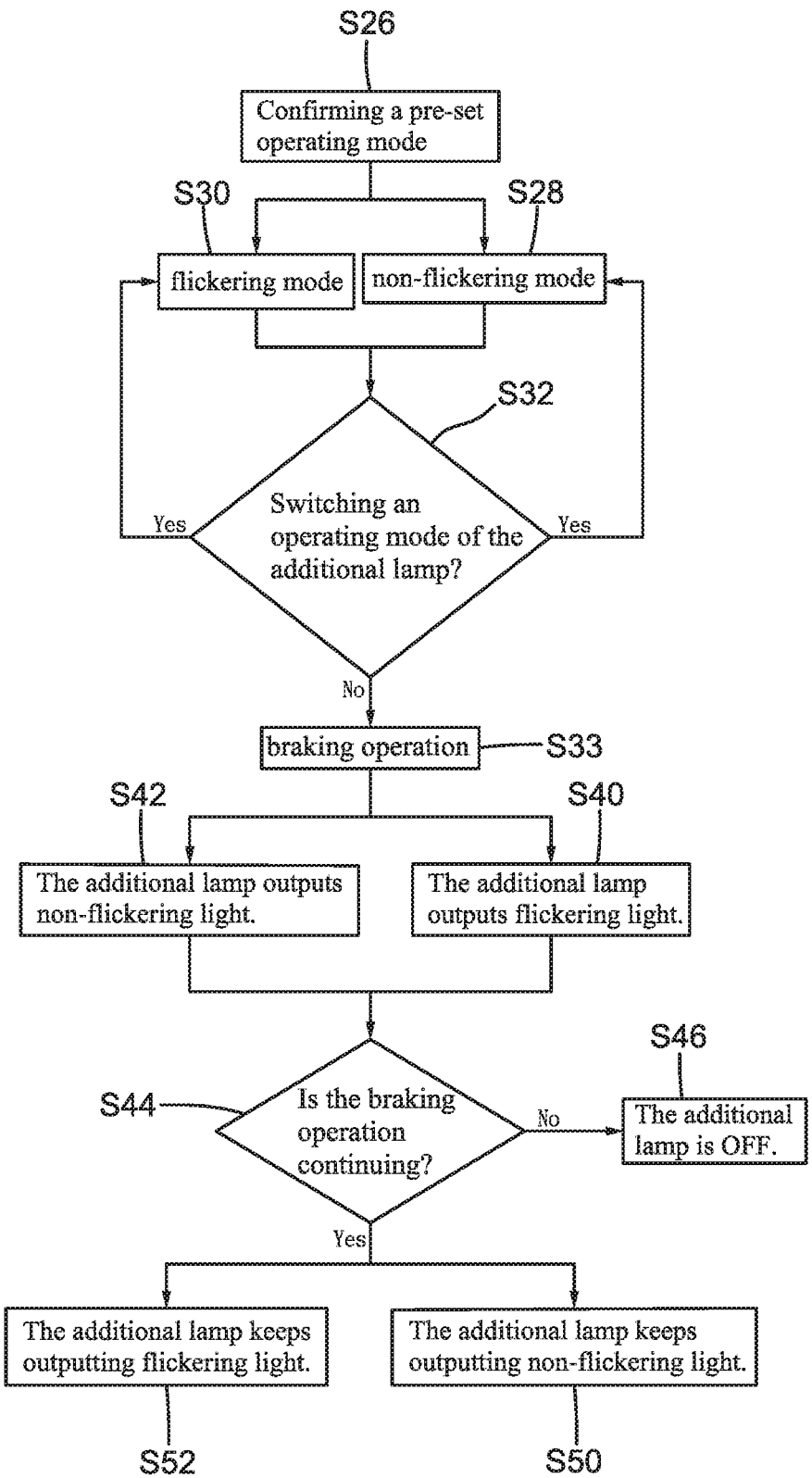
FIG. 1 is a flowchart illustrating a method for controlling and switching operational modes of an additional lamp for a vehicle of a first embodiment according to the present invention.

The present invention provides a method for controlling and switching operational modes of an additional lamp for a vehicle. The additional lamp can be an aftermarket lamp (not an OEM lamp) mounted on the vehicle. In a first embodiment shown in FIG. 1, the method includes confirming a pre-set operational mode of the additional lamp (step S26). The pre-set operational mode can be a non-flickering mode (S28) or a flickering mode (S30). Specifically, the additional lamp is configured to work with a brake of the vehicle. When the brake operates, the additional lamp generates flickering or non-flickering light, which is based on the pre-set status of the additional lamp.

In step S32, it is determined whether to switch the operating mode of the additional lamp. Specifically, when a continuous first signal and intermittent second signals come from the vehicle, the additional lamp switches from the preset operating mode (such as a flickering mode) to another operating mode (such as the non-flickering mode). In an example, the additional lamp switches from the non-flickering mode to the flickering mode. On the other hand, when no continuous first signal and no intermittent second signals come from the vehicle, the additional lamp remains in the preset operating mode (flickering or non-flickering).

Specifically, the operating mode (flickering or non-flickering) of the additional lamp can be switched according to the need or the habit of the driver. Furthermore, the first signal can be a braking signal, and the second signal can be a signal activating a position lamp (also called small lamp) of the vehicle. Furthermore, the intermittent plural second signals can be two second signals received within 3 seconds. More specifically, the operating mode of the additional lamp is switched only when two conditions are fulfilled. The first condition is a continuous first signal. The second condition is plural second signals are received within 3 seconds while the first signal continues. Taking a car as an example, the first signal is obtained after the brake pedal is pressed. Furthermore, the position lamp is turned on twice in 3 seconds (such as turn on, turn off, and turn on in 3 seconds or turn off, turn on, turn off, and turn on in 3 seconds) while pressing the brake pedal. Thus, a pre-set flickering mode can be switched to a non-flickering mode or a pre-set non-flickering mode can be switched to a flickering mode. In an embodiment, three second signals are inputted. In this case, when the position lamp is only turned on one time while pressing the brake pedal (the first signal), the additional lamp still remains the preset status. In another case, the position lamp is turned on one or more times without pressing the brake pedal, the additional lamp still remains the preset status.

In step S33, braking operation is carried out. When the brake is operating and the additional lamp is in the non-flickering mode, the additional lamp generates non-flickering light. On the other hand, when the brake is operating and the additional lamp is in the flickering mode, the additional lamp generates flickering light. In step S44, it is identified whether the braking operation continues. If not, the additional lamp is turned off. When the braking operation continues and the additional lamp is in the flickering mode, the additional lamp keeps outputting flickering light (S52). When the braking operation continues and the additional lamp is in the non-flickering mode, the additional lamp keeps outputting non-flickering light (S50).

Figure 2:
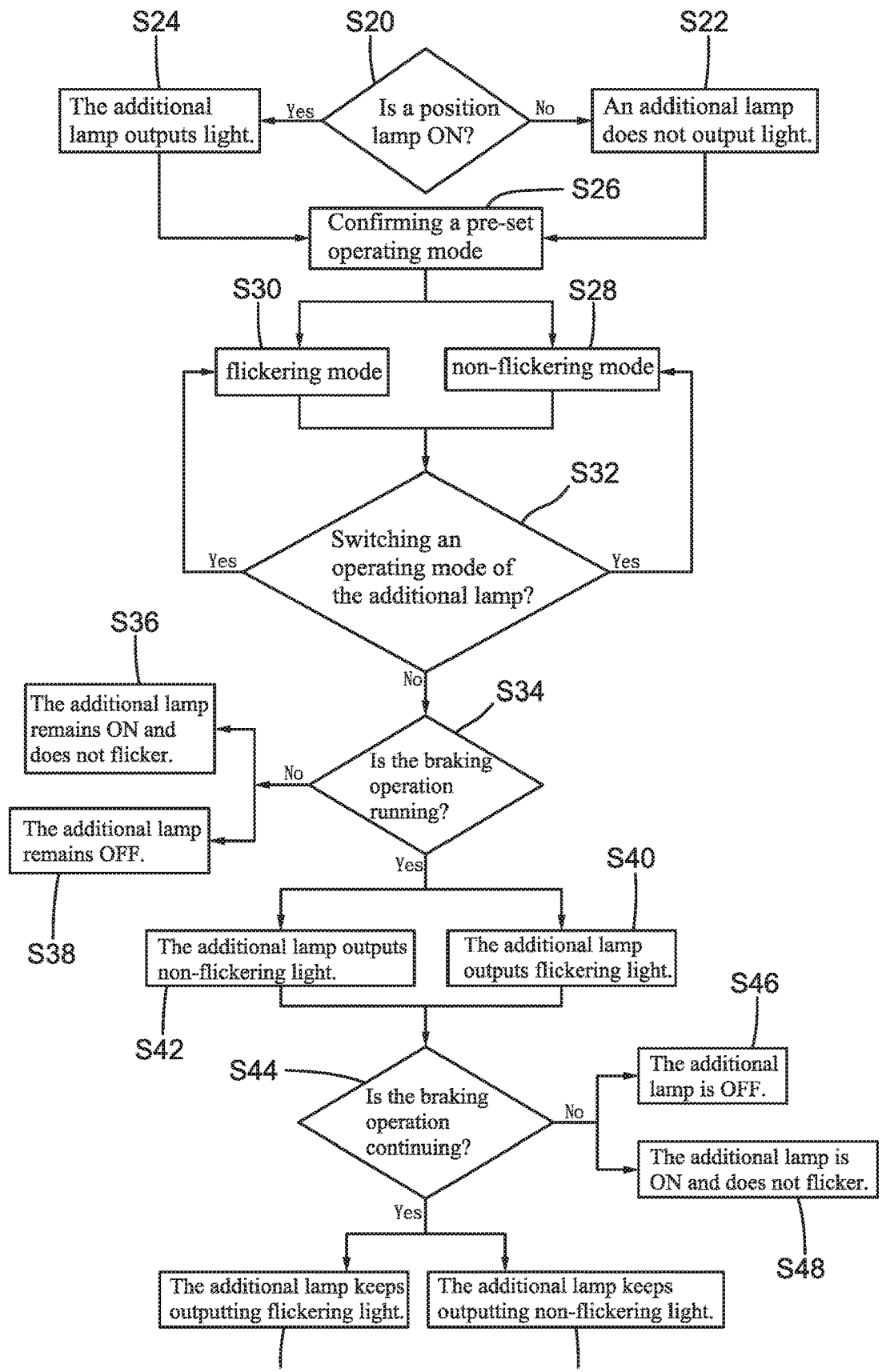
FIG. 2 is a flowchart illustrating a method for controlling and switching operational modes of an additional lamp for a vehicle of a second embodiment according to the present invention.

The method according to the present invention can be carried out in a manner other than the first embodiment described with reference to FIG. 1. In a second embodiment shown in FIG. 2, the method includes a step of identifying whether the position lamp of the vehicle is in an on state (see step S20). When the position lamp is on, the additional lamp outputs light (S24). On the other hand, when the position lamp is off, the additional lamp does not output light (S22).

In step S26, the pre-set operational mode of the additional lamp is confirmed. The pre-set operational mode can be a non-flickering mode (S28) or a flickering mode (S30). Specifically, the additional lamp is configured to work with a brake of the vehicle. When the brake operates, the additional lamp generates flickering or non-flickering light, which is based on the pre-set values of the additional lamp.

In step S32, it is determined whether to switch the operating mode of the additional lamp. Specifically, when a continuous first signal and intermittent second signals come from the vehicle, the additional lamp switches from the preset operating mode (such as a flickering mode) to another operating mode (such as the non-flickering mode). In an example, the additional lamp switches from the non-flickering mode to the flickering mode. On the other hand, when no continuous first signal and no intermittent second signals come from the vehicle, the additional lamp remains in the preset operating mode (flickering or non-flickering).

Specifically, the operating mode (flickering or non-flickering) of the additional lamp can be switched according to the need or the habit of the driver. Furthermore, the first signal can be a braking signal, and the second signal can be a signal activating a position lamp (also called small lamp) of the vehicle. Furthermore, the intermittent plural second signals can be two second signals received within 3 seconds. More specifically, the operating mode of the additional lamp is switched only when two conditions are fulfilled. The first condition is a continuous first signal. The second condition is plural second signals are received within 3 seconds while the first signal continues. Taking a car as an example, the first signal is obtained after the brake pedal is pressed. Furthermore, the position lamp is turned on twice in 3 seconds (such as turn on, turn off, and turn on in 3 seconds or turn off, turn on, turn off, and turn on in 3 seconds) while pressing the brake pedal. Thus, a pre-set flickering mode can be switched to a non-flickering mode or a pre-set non-flickering mode can be switched to a flickering mode. In an embodiment, three second signals are inputted. In this case, when the position lamp is only turned on one time while pressing the brake pedal (the first signal), the additional lamp still remains the preset status. In another case, the position lamp is turned on one or more times without pressing the brake pedal, the additional lamp still remains the preset status.

In step S34, it is identified whether the braking operation is running. When the braking operation is cunning, the position lamp is off, and the additional lamp is in the non-flickering mode, the additional lamp generates non-flickering light (S42). When the braking operation is running, the position lamp is on, and the additional lamp is in the flickering mode, the additional lamp generates flickering light (S40). When the braking operation is not running and the position lamp is off, the additional lamp remains in an off state regardless of the operating mode of the additional lamp (S38). When the braking operation is not running and the position lamp is on, the additional lamp is turned on and does not flicker regardless of the operating mode of the additional lamp (S36).

In step S44, it is identified whether the braking operation continues. When the braking operation continues, the position lamp is off, and the additional lamp is in the non-flickering mode, the additional lamp keeps outputting non-flickering light (S50). When the braking operation continues, the position lamp is off, and the additional lamp is in the flickering mode, the additional lamp keeps outputting flickering light (S52). When the braking operation is not running and the position lamp is off, the additional lamp is turned off regardless of the operating mode of the additional lamp (S46). When the braking operation is not naming and the position lamp is on, the additional lamp remains in an on state without flickering regardless of the operating mode of the additional lamp.

The method according to the present invention can operate without adding or modifying any switch. Specifically, the braking signal and the position lamp signal originally available from the vehicle can be used to switch the additional lamp between the flicking mode and non-flickering mode. Furthermore, the continuous first signal and the plural second signals for controlling the switching can effectively avoid erroneous operations.

The additional lamp can generate flickering light when the vehicle is braking, effectively reminding the drivers of other vehicles behind the vehicle that the vehicle is reducing the speed, thereby enhancing the driving safety.

Now that the basic teachings of the present invention have been explained, many extensions and variations will be obvious to one having ordinary skill in the art. For example, the second signals can be signals not for activating the position lamp. As an example, the second signals can be signals for turning on the headlamps of the vehicle. In this case, the operating mode of the additional lamp can be switched when the headlamps are turned on a plurality of times (such as three times) within 3 seconds.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for controlling and switching operational modes of an additional lamp for a vehicle, comprising:
confirming a pre-set operating mode of the additional lamp, with the pre-set operating mode being a non-flickering mode or a flickering mode;
determining whether to switch the pre-set operating mode of the additional lamp to another operating mode, wherein the additional lamp is switched from the pre-set operating mode to the another operating mode when a continuous first signal and intermittent plural second signals come from the vehicle, and wherein the additional lamp remains in the pre-set operating mode when no continuous first signal and no intermittent plural second signals come from the vehicle;
carrying out a braking operation, wherein when the brake is operating and the additional lamp is in the non-flickering mode, the additional lamp generates non-flickering light, and wherein when the brake is operating and the additional lamp is in the flickering mode, the additional lamp generates flickering light; and
identifying whether the braking operation continues, wherein the additional lamp is turned off when the braking operation stops, wherein when the braking operation continues and the additional lamp is in the flickering mode, the additional lamp keeps outputting flickering light, and wherein when the braking operation continues and the additional lamp is in the non-flickering mode, the additional lamp keeps outputting non-flickering light.

2. The method as claimed in claim 1, wherein the intermittent plural second signals includes receiving two second signals within 3 seconds.

3. The method as claimed in claim 1, wherein the first signal is a braking signal, wherein the second signal is a signal for turning on a position lamp or a headlamp of the vehicle, and wherein the intermittent plural second signals includes receiving three second signals within 3 seconds.

4. The method as claimed in claim 2, wherein when a headlamp of the vehicle is turned on, turned off, and turned on again within 3 seconds while the brake is being pressed, the additional lamp is switched from the flickering mode to the non-flickering mode or switched from the non-flickering mode to the flickering mode.

5. The method as claimed in claim 3, wherein when the headlamp is turned on, turned off, and turned on again within 3 seconds while the brake is being pressed, the additional lamp is switched from the flickering mode to the non-flickering mode or switched from the non-flickering mode to the flickering mode.

6. A method for controlling and switching operational modes of an additional lamp for a vehicle, comprising:
identifying whether a position lamp of the vehicle is in an on state, wherein the additional lamp outputs light when the position lamp is on, and wherein the additional lamp does not output light when the position lamp is off;
confirming a pre-set operating mode of the additional lamp, with the pre-set operating mode being a non-flickering mode or a flickering mode;
determining whether to switch the pre-set operating mode of the additional lamp to another operating mode, wherein the additional lamp is switched from the pre-set operating mode to the another operating mode when a continuous first signal and intermittent plural second signals come from the vehicle, and wherein the additional lamp remains in the pre-set operating mode when no continuous first signal and no intermittent plural second signals come from the vehicle;
identifying whether a braking operation is running, wherein when the braking operation is running, the position lamp is off, and the additional lamp is in the non-flickering mode, the additional lamp generates non-flickering light, wherein when the braking operation is running, the position lamp is on, and the additional lamp is in the flickering mode, the additional lamp generates flickering light, wherein when the braking operation is not running and the position lamp is off, the additional lamp remains in an off state regardless of the operating mode of the additional lamp, and wherein when the braking operation is not running and the position lamp is on, the additional lamp is turned on and does not flicker regardless of the operating mode of the additional lamp; and
identifying whether the braking operation continues, wherein when the braking operation continues, the position lamp is off, and the additional lamp is in the non-flickering mode, the additional lamp keeps outputting non-flickering light, wherein when the braking operation continues, the position lamp is off, and the additional lamp is in the flickering mode, the additional lamp keeps outputting flickering light, wherein when the braking operation is not running and the position lamp is off, the additional lamp is turned off regardless of the operating mode of the additional lamp, and wherein when the braking operation is not running and the position lamp is on, the additional lamp remains in an on state without flickering regardless of the operating mode of the additional lamp.

7. The method as claimed in claim 6, wherein the intermittent plural second signals includes receiving two second signals within 3 seconds.

8. The method as claimed in claim 6, wherein the first signal is a braking signal, wherein the second signal is a signal for turning on a position lamp or a headlamp of the vehicle, and wherein the intermittent plural second signals includes receiving three second signals within 3 seconds.

9. The method as claimed in claim 7, wherein when a headlamp of the vehicle is turned on, turned off, and turned on again within 3 seconds while the brake is being pressed, the additional lamp is switched from the flickering mode to the non-flickering mode or switched from the non-flickering mode to the flickering mode.

10. The method as claimed in claim 8, wherein when the headlamp is turned on, turned off, and turned on again within 3 seconds while the brake is being pressed, the additional lamp is switched from the flickering mode to the non-flickering mode or switched from the non-flickering mode to the flickering mode.

* * * * *